(12) United States Patent
Kim (10) Patent No.: US 12,283,036 B2
(45) Date of Patent: Apr. 22, 2025

(54) AUTOMATIC DETERMINATION PROCESS DEVICE, AUTOMATIC DETERMINATION PROCESS METHOD, INSPECTION SYSTEM, PROGRAM, AND RECORDING MEDIUM

(71) Applicant: JE INTERNATIONAL CORPORATION, Gifu (JP)

(72) Inventor: Minsu Kim, Gifu (JP)

(73) Assignee: JE INTERNATIONAL CORPORATION, Gifu (JP)

( * ) Notice: Subject to any disclaimer, the term of this patent is extended or adjusted under 35 U.S.C. 154(b) by 595 days.

(21) Appl. No.: 17/619,607

(22) PCT Filed: Jul. 14, 2020

(86) PCT No.: PCT/JP2020/027347
§ 371 (c)(1),
(2) Date: Dec. 16, 2021

(87) PCT Pub. No.: WO2021/010390
PCT Pub. Date: Jan. 21, 2021

(65) Prior Publication Data
US 2022/0351361 A1 Nov. 3, 2022

(30) Foreign Application Priority Data
Jul. 18, 2019 (JP) .................. 2019-132725

(51) Int. Cl.
*G06T 7/00* (2017.01)
(52) U.S. Cl.
CPC ........ *G06T 7/0004* (2013.01); *G06T 2200/24* (2013.01); *G06T 2207/20081* (2013.01); *G06T 2207/30141* (2013.01)
(58) Field of Classification Search
CPC ............... G06T 7/0004; G06T 2200/24; G06T 2207/20081; G06T 2207/30141;
(Continued)

(56) References Cited

U.S. PATENT DOCUMENTS 6,940,527 B2 * 9/2005 Hattori .................. G06T 7/0004
700/121
7,894,658 B2 * 2/2011 Hiroi ...................... H01J 37/28
348/126
(Continued)

FOREIGN PATENT DOCUMENTS

CN 1960602 A 5/2007
CN 103093818 B 9/2017
(Continued)

OTHER PUBLICATIONS

International Search Report for related Application No. PCT/JP2020/027347, mailed Oct. 6, 2020, 3 pages.
(Continued)

*Primary Examiner* — Sheela C Chawan
(74) *Attorney, Agent, or Firm* — Procopio, Cory, Hargreaves & Savitch LLP (57) ABSTRACT

An automatic determination process device 1 comprises image acquisition units 14, 147, 247, an automatic determination unit 15, and determination result output units 14, 148, 248. An error detection verification device 2 displays a defect candidate image on a display device. The error detection verification device 2 acquires, via an input device, secondary inspection determination result information about the defect candidate image. The image acquisition units 14, 147, 247 read the defect candidate image displayed by the error detection verification device 2 from a medium for displaying the same on the display device. The automatic determination unit 15 executes a determination process on the basis of the content of the defect candidate image read by the image acquisition units 14, 147, 247 and outputs a determination result. The determination result output units 14, 148, 248 generate a signal in accordance with the determination result. Said signal is equivalent to pressing, via the input device connected to the error detection verifi- (Continued)

cation device 2, either a "defect" button or a "good" button included on a screen displayed by the error detection verification device 2.

10 Claims, 5 Drawing Sheets (58) Field of Classification Search
CPC ....... G01N 2021/8887; G01N 21/8851; G01N 21/93; G01N 21/956; G01N 2021/888; G06N 20/00; B07C 5/34
See application file for complete search history.

(56) References Cited

U.S. PATENT DOCUMENTS

| | | | | |
|---|---|---|---|---|
| 8,040,504 | B2* | 10/2011 | Saito | G01R 31/308 |
| | | | | 356/237.4 |
| 8,139,847 | B2* | 3/2012 | Yamaguchi | G06T 7/0004 |
| | | | | 382/149 |
| 8,660,336 | B2* | 2/2014 | Ueno | G03F 7/7065 |
| | | | | 716/51 |
| 10,878,559 | B2* | 12/2020 | Tsou | G06F 11/3438 |
| 2006/0029257 | A1 | 2/2006 | Eguchi et al. | |
| 2015/0256206 | A1 | 9/2015 | Nakagata | |
| 2020/0242746 | A1* | 7/2020 | Zhang | G07D 7/206 |

FOREIGN PATENT DOCUMENTS

| | | |
|---|---|---|
| CN | 1094844504 A | 6/2019 |
| JP | 2002031605 A | 1/2002 |
| JP | 2006047041 A | 2/2006 |
| JP | 2009150718 A | 7/2009 |
| JP | 2015075412 A | 4/2015 |
| JP | 6218094 B1 | 10/2017 |
| JP | 2018036241 A | 3/2018 |
| JP | 2018059830 A | 4/2018 |
| KR | 1020060082917 A | 7/2006 |

OTHER PUBLICATIONS

Written Opinion for related Application No. PCT/JP2020/027347, mailed Oct. 6, 2020, 3 pages.

\* cited by examiner

```
1  while(not end_of_images) {
2      get_next_image_for_verification();
3      capture_screen();
4      image_for_verification:=extract_rectangle_image_from_screen(120, 200, 720, 600);
5      result:=automated_verification(image_for_verification);
6      input_process(result);
7  }
```

AUTOMATIC DETERMINATION PROCESS DEVICE, AUTOMATIC DETERMINATION PROCESS METHOD, INSPECTION SYSTEM, PROGRAM, AND RECORDING MEDIUM

TECHNICAL FIELD

The present invention relates to an automatic determination process device, an automatic determination processing method, an inspection system, a program, and a recording medium.

This application claims priority to and the benefit of Japanese Patent Application No. 2019-132725 filed in the Japan Patent Office on Jul. 18, 2019, the entire contents of which are incorporated herein by reference.

BACKGROUND ART

An optical inspection using a camera is generally used for an inspection of a printed substrate with a wiring pattern of a copper foil in a resin film. In the optical inspection, a method is widely used, in which a computer performs image processing of comparing a captured image of an inspected object and a reference image, and detects a defect. However, by the method, there is a possibility that a part which is not originally the defect will be misrecognized as the defect. This is called error detection (false information). Accordingly, there is a problem in that an operator should check an image processing result by the computer again.

Patent Document 1 discloses a technology for adjusting a reference for detecting the defect in order to reduce the error detection. Specifically, Paragraph 0006 of Patent Document 1 discloses that 'an inspection capable of suppressing occurrence of at least one of the false information and overlooking, and enhancing a detection precision of the defect', etc., is provided.

PATENT DOCUMENT

Patent Document 1: Japanese Patent Application No. JP6218094

DESCRIPTION

Technical Problem

It is preferable that whether a defect reported according to a result of image processing by a computer is a true defect (true information) or a false defect (false information (error detection)) may be efficiently determinated.

In related art, an error detection verification device (or error detection verification program) displays an image having a defect reported according to the result of the image processing by the computer on a screen of the computer. Further, an operator (person) checks the image displayed on the screen with eyes to determinate whether the image is the true information or the false information. In addition, the operator uses an input device such as a keyboard or a mouse, and inputs a determination result into the error detection verification device. Enabling reduction of such a task by the operator leads efficiency of an inspection.

In the efficiency of the inspection, making a small change for a conventional system (error detection verification device) as possible leads to enhancement of investment efficacy for an inspection facility.

The present invention is conducted based on recognition of the object. The present invention has been made in an effort to provide an automatic determination process device, an automatic determination processing method, an inspection system, a program, and a recording medium capable of efficienating a task of determinating a displayed image with eyes and making a small change as possible for an existing facility.

Technical Solution

An automatic determination process device according to an embodiment includes an image acquisition unit, an automatic determination unit, and a determination result output unit. An error detection verification device displays a detect candidate image in a display device and acquires a determination result of a secondary inspection for the defect candidate image through an input device. The image acquisition unit reads the defect candidate image displayed by the error detection verification device from a medium for displaying the defect candidate image in the display device. The automatic determination unit executes automatic determination processing based on contents of the defect candidate image read by the image acquisition unit and outputs the determination result. The determination result output unit generates a signal according to the determination result. The signal is an equivalent signal to pressing any one of a "defect" button or a "good" button included in a screen displayed by the error detection verification device through an input device connected to the error detection verification device.

The automatic determination unit possesses a model of which machine learning is completed for a relationship between the defect candidate image and the determination result, and applies the model to the image to perform the determination processing.

The error detection verification device may display and output the defect candidate image detected by optically reading an electronic circuit. The automatic determination unit may output the determination result by performing processing of determinating whether the electronic circuit is good or defect based on the defect candidate image.

The input device may be at least nay one of the mouse or the keyboard. When the input device is the mouse, the determination result output unit incurs a mouse event to move any one area of the "defect" button or the "good" button, and then generate a signal for clicking the mouse. When the input device is the keyboard, the determination result output unit incurs a keyboard event to move a focus to any one area of the "defect" button or the "good" button, and then generate clicking the mouse, and generate a signal of a determination manipulation.

The automatic determination process device may further include a scenario execution unit. The scenario execution unit executes a scenario in which a processing order is described. The scenario allows the scenario execution unit to serve as the image acquisition unit and the determination result output unit.

The scenario execution unit may perform a processing order required for the error detection verification device to display the image in the display device by executing the scenario.

An automatic determination processing method includes an image acquisition step, an automatic determination step, and a determination result output step. An error detection verification device displays a defect candidate image in a display device and acquires a determination result of a secondary inspection for the defect candidate image through an input device as a second inspection. In the image acquisition step, for example, the defect candidate image displayed by the error detection verification device is read from a medium for displaying the defect candidate image in the display device. In the automatic determination step, for example, a computer outputs a determination result by executing automatic determination processing based on contents of the defect candidate image read in the image acquisition step. In the determination result output step, for example, the computer generates a signal which is a signal according to the determination result, and is an equivalent signal to pressing any one of a "defect" button or a "good" button included in a screen displayed by the error detection verification device through an input device connected to the error detection verification device.

A program allows the computer to execute the automatic determination processing method. A computer readable recording medium has the program recorded therein.

An inspection system is configured to include: an optical inspection device; an error detection verification device; and an automatic determination process device. The optical inspection device detects a defect candidate image as a primary inspection based on an optically photographed image. The error detection verification device displays the defect candidate image detected by the optical inspection device in a display device and acquires a determination result of a secondary inspection for the defect candidate image through an input device as a second inspection. The automatic determination process device is one automatic determination process device of the devicees disclosed as a solving means.

Advantageous Effect

According to the present invention, determination for an image which an external device displays in a display device and a response based on a determination result can be automated.

MODE FOR THE INVENTION

Next, embodiments of the present invention will be described.

First Embodiment

Figure 1:
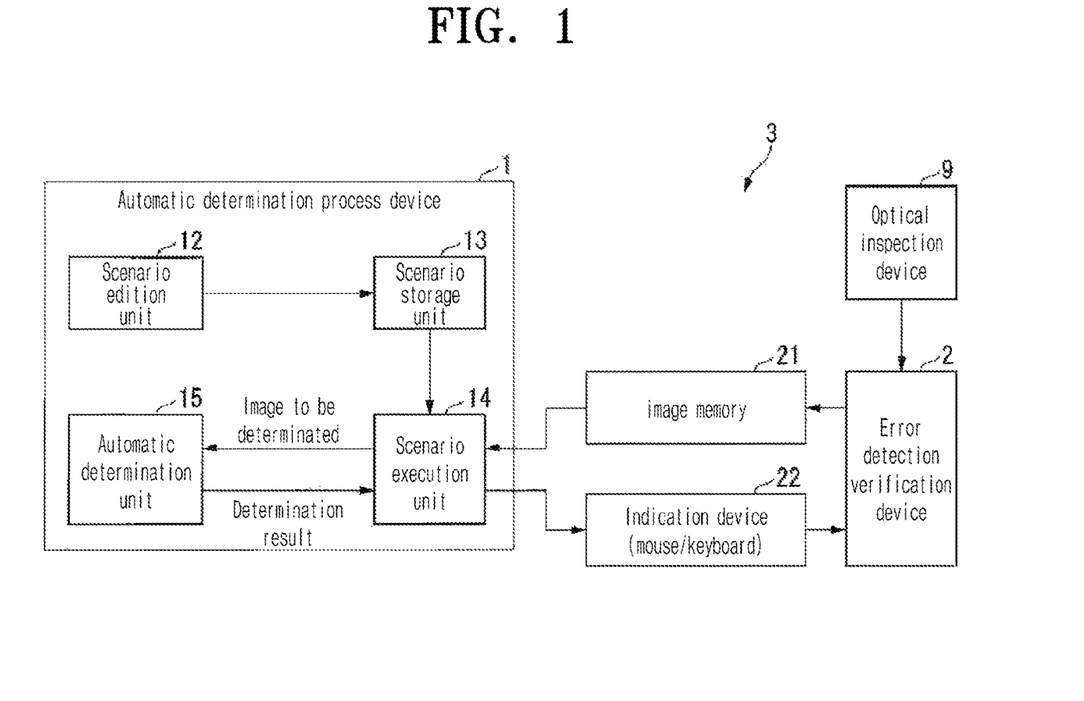
FIG. 1 is a block diagram illustrating a functional configuration of an inspection system according to an embodiment.

FIG. 1 is a block diagram illustrating a functional configuration of an inspection system according to a first embodiment.

As illustrated, an inspection system 3 includes an automatic determination process device 1, an error detection verification device 2, and an optical inspection device 9. The automatic determination process device 1 includes a scenario edition unit 12, a scenario storage unit 13, a scenario execution unit 14, and an automatic determination unit 15. The inspection system 3 as a part of a function for an input/output includes an image memory 21 and the indication device 22. The function of each unit is implemented by using an electronic circuit, for example. Moreover, at least a partial function of each unit is configured to be implemented by a computer and a program. The error detection verification device 2 is an "external device" when viewed from the automatic determination process device 1 side. A schematic description of the function included in the inspection system 3 is as follows.

The inspection system 3 is a system configured by automating an existing process determined by a person by using robotic process automation (RPA) scheme. Specifically, the inspection system 3 allows the error detection verification device 2 of which manipulation and determination by the person is required in the related art to be operated not by the person. As a method for this the automatic determination process device 1 captures a defect candidate image which the error detection verification device 2 outputs to the screen. The automatic determination process device 1 automatically determinates (secondarily inspects) whether the defect candidate image is good or no good by using artificial intelligent technology. The automatic determination process device 1 automatically inputs the determination result into the error detection verification device 2.

Thereby, the automatic determination process device 1 automatically executes the determination processing based on the image. Accordingly, when the inspection system 3 is used, the person need not see and determine the defect candidate image output as a primary inspection result from the optical inspection device 9 with eyes one by one. The automatic determination process device 1 automatically supplies a signal of emulating a mouse or a keyboard to the error detection verification device 2 based on the determination result. Accordingly, the person need not input the determination result by using the mouse or the keyboard. Further, since the automatic determination process device 1 is configured, the determination of the person or the manipulation of the person is not required in order to execute a secondary inspection.

That is, the automatic determination process device 1 operates as follows by using the PRA scheme. That is, the automatic determination process device 1 captures an image of the defect candidate image which the error detection verification device 2 displays on the screen. Further, the automatic determination process device 1 determinates the defect candidate image by using the artificial intelligent technology; i.e., a machine learning model in which learning processing ends. The determination result is good or defect (actually defect). When the determination result is good, the automatic determination process device 1 automatically generates a mouse or keyboard event to return a signal indicating that the defect candidate image is actually good (error detection) to the error detection verification device 2. When the determination result is defect, the automatic determination process device 1 automatically generates the mouse or keyboard event to return a signal indicating that the defect candidate image is truly defect (not error detection) to the error detection verification device 2. As such, an interface between the automatic determination process device 1 and the error detection verification device 2 is through the display device, or the mouse or the keyboard. That is, automation of the secondary inspection may be implemented without changing the existing error detection verification device 2 (e.g., without modifying the program).

The optical inspection device 9 has a camera therein. The optical inspection device 9 photographs a circuit board by using the camera, and detects a candidate of a defect location such as the circuit based on the image by the primary inspection. The optical inspection device 9 outputs an image (defect candidate image or NG image) for a product (circuit board, etc.) to be inspected, which includes the detected defect location. The optical inspection device 9 passes the defect candidate image to the error detection verification device 2. Moreover, the defect candidate image output by the optical inspection device 9 may be a gray scale image or a color image. Further, the optical inspection device 9 itself may be implemented by using the existing technology.

In the circuit board, for example, a wiring by a metal thin film is formed on a resin plate. Moreover, on the circuit board, an area where the wiring by metal exists is referred to as a wiring area and other area (area where the wiring does not exist) is referred to as a spatial area. An example of the defect in the circuit board is as follows. A first defect is a defect in which one wiring area to be connected is separated into two or more wiring areas by the spatial area and this defect is called "open". A second defect is a defect in which two wiring areas to be separated by the spatial area are electrically connected to each other and this defect is called "short". A second defect is a defect in which a width of a direction orthogonal to a longitudinal direction of the wiring area having a linear shape is narrower than a predetermined allowance range or more and this defect is called "deficiency". A fourth defect is a defect in which a width of a direction orthogonal to a longitudinal direction of the wiring area having a linear shape is wider than a predetermined allowance range or more and this defect is called "protrusion". A fifth defect is a defect in which the wiring exists in an island shape in a part of an area which is originally the spatial area, and this defect is called "island". A sixth defect is a defect in which a space exists in a pin hole state in a part of a location which extends as an area which is originally the wiring area, and this defect is called "pin hole". There may also be a defect other than types listed herein. A circuit board which may include any one of the above defects is picked by the optical inspection device 9 by the primary inspection.

The error detection verification device 2 is an device for determining (secondary inspection) whether the defect candidate image output from the optical inspection device 9 is an image (true information) acquired by actually photographing a defect product or an image (false information or error detection) acquired by photographing a product which is not defect. For the determination, originally, the error detection verification device 2 executes processing for displaying the defect candidate image in the display device of the computer. Further, the original error detection verification device 2 acquires a determination result of a person (operator) who sees the defect candidate image displayed in the display device, from the input device (e.g., the keyboard or mouse). In addition, the error detection verification device 2 performs processing of determinating an original product based on the input determination result (good or defect). The error detection verification device 2 itself is implementable by using existing technology.

In the embodiment, the automatic determination process device 1 automatically performs the determination (secondary inspection) instead of the operator. As a result, the automatic determination process device 1 acquires, from the image memory 21, the defect candidate image (an image to be judged) which the error detection verification device 2 displays in the display device 2. The automatic determination process device 1 automatically determinates whether the acquired image is good or defect, and output the determination result. Further, the automatic determination process device 1 passes a signal (a signal according to the determination result) equivalent to the input from the input device (keyboard or mouse) which the operator performs originally to the error detection verification device 2 via the indication device 22.

The image memory 21 is a memory which at least temporarily keeps and maintains the image which the error detection verification device 2 displays in the display device. The image memory 21 is implemented by using a semiconductor memory (readable and writable random access memory (RAM)), for example. The image memory 21 is generally a memory managed by a driver of the display device of the computer. In the embodiment, the automatic determination process device 1 is configured to acquire the image kept and maintained by the image memory 21 by accessing the image memory 21.

The indication device 22 has a function to pass information corresponding to signal contents to the error detection verification device 2 based on the signal from the input device such as the mouse or the keyboard. The indication device 22 is generally implemented as the driver of the input device such as the mouse or the keyboard. In the embodiment, the automatic determination process device 1 is configured to virtually manipulate the mouse or the keyboard supply a signal corresponding to the manipulation to the indication device 22.

Moreover, herein, as an example, a case where an indication is performed by using the keyboard or the mouse is described, but an information input into the error detection verification device 2 may be performed by using another device. For example, a touch panel or a touch pen, and a voice or an optical pattern (barcode or 2D code) reader may be used except for the keyboard or the mouse. In any case, the indication device 22 passes the same as a case of manipulating a physical input device to the error detection verification device 2 based on the indication from the automatic determination process device 1.

The automatic determination process device 1 includes a scenario edition unit 12, a scenario storage unit 13, a scenario execution unit 14, and an automatic determination unit 15 as described above. The automatic determination process device 1 executes a scenario stored in the scenario storage unit 13 to execute processing corresponding to the secondary inspection.

The scenario edition unit 12 edits a scenario for executing by the automatic determination process device 1. The scenario is described by using a scenario describing language.

The scenario describing language may be a language represented as a string of characters or a diagrammatic language represented by combining figures. The scenario edition unit 12 has a user interface. The user may edit the scenario through the user interface (e.g., by using an editor function of character data). The scenario edition unit 12 writes the scenario which is an edition result in the scenario storage unit 13.

The scenario storage unit 13 stores the scenario. The scenario is appropriately stored in a text data format or a binary data format. The scenario storage unit 13 is implemented by using the semiconductor memory or a magnetic disk device. The scenario stored in the scenario storage unit 13 may be referred to by the scenario edition unit 12 and the scenario execution unit 14. The scenario may be edited by the scenario edition unit 12. The scenario may be executed by the scenario execution unit 14.

The scenario execution unit 14 reads the scenario from the scenario storage unit 13 and executes the scenario. The scenario execution unit 14 executes the scenario by an appropriate scheme such as an interpreter scheme or a compiler scheme, for example. In the embodiment, the scenario execution unit 14 may read data of the image from the image memory 21 and pass the image (image to be determinated) to the automatic determination unit 15 as specific processing. Further, the scenario execution unit 14 may receive the determination result from the automatic determination unit 15 and deliver a signal based on the determination result to the indication device 22.

The automatic determination unit 15 performs determination processing for the image (an image to be determinated for a product) received from the scenario execution unit 14 and returns the determination result to the scenario execution unit 14. As a specific example, the automatic determination unit 15 receives a band candidate image of the product as the image to be determinated from the scenario execution unit 14. In addition, the automatic determination unit 15 determinates whether the product included in the image is truly defect (true information) or not defect (false information). That is, the automatic determination unit 15 executes an automatic determination step.

The automatic determination unit 15 performs the determination processing by using a machine learning technique, for example. That is, the automatic determination unit 15 has a machine learning model therein. As an example of the machine learning model, a neural network may be used. The machine learning model is a state in which learning ends in advance. That is, the automatic determination unit 15 prepares, as a large quantity of correct answers, an image of a true example (true information) and an image of a false example (false information) as learning data in advance and executes machine learning processing using the learning data. Accordingly, the already learned machine learning model may perform right determination processing for an input unknown image to be determinated.

Figure 2:
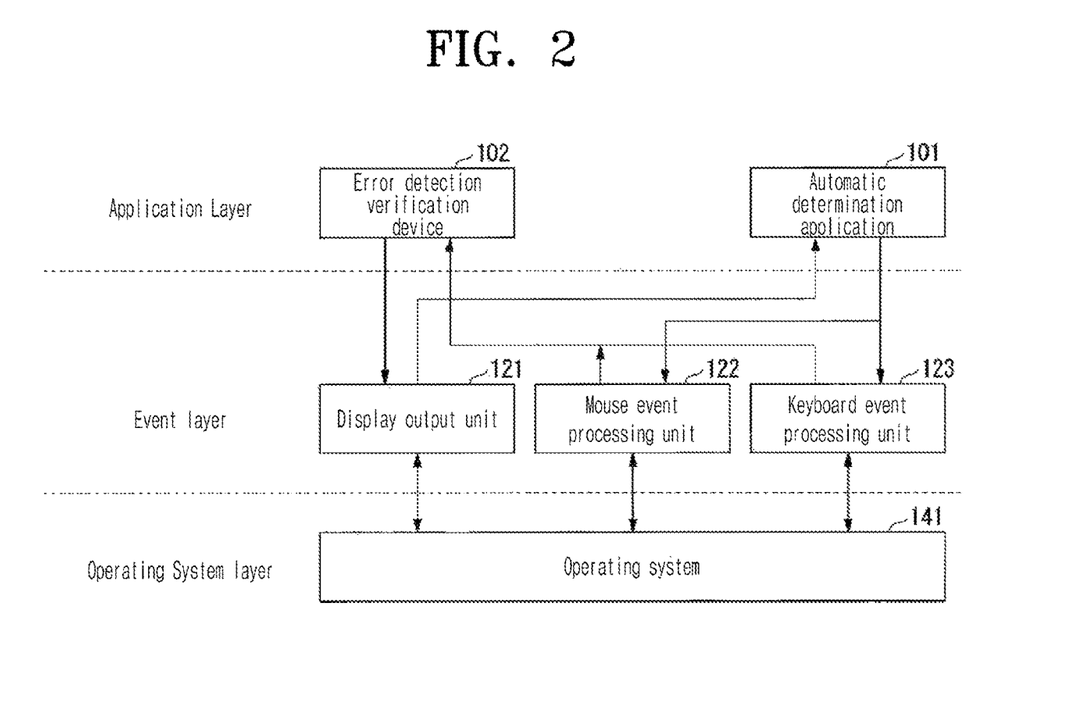
FIG. 2 is a schematic diagram illustrating a configuration of a program in the case of implementing the inspection system according to the first embodiment by using a computer.

FIG. 2 is a schematic diagram illustrating a configuration of a program in the case of implementing the inspection system 3 by using the computer. As illustrated, the program included in the inspection system 3 is configured to belong to any one layer of an application layer, an event handling layer, and an operating system layer. An operating system 141 belongs to the operating system layer. A display output unit 121, a mouse event processing unit 122, and a keyboard event processing unit 123 belong to the event handling layer. An automatic determination application and an error detection verification application 102 belong to the application layer. All of the programs are executed in an execution environment having a central processing unit (CPU) or the memory.

The operating system 141 appropriately controls all computer resources (CPU time, memory, input/output device, etc.) to appropriately allocate the controlled computer resources to each process which is run on the computer. As the operating system 131, for example, Windows, Linux, UNIX, etc., (each is a registered trademark) are used.

The automatic determination application 101 is a program having a function to determinate good or defect based on an image of a given product (electronic circuit). The automatic determination application 101 has a function corresponding to the automatic determination process device 1 of FIG. 1. The automatic determination application implements so-called robotic process automation (RPA). Moreover, the automatic determination application 101 is also called "RPA Judgment Application".

The error detection verification application 102 is a program having a function to display the defect candidate image of the product which may be acquired as the result of the primary inspection on the screen and receive an input of the secondary inspection result (good or defect). In other words, the error detection verification application 102 has a function for executing re-judgment of the image judged to be defect in the primary inspection by the optical inspection device 9 (FIG. 1). The error detection verification application 102 has a function corresponding to the error detection verification device 2 in FIG. 1. Moreover, the error detection verification application 102 is also called "Verification Application".

Each of the display output unit 121, the mouse event processing unit 122, or the keyboard event processing unit 123 appropriately handles the input/output event of the computer. The program which belongs to the event handling layer is to control various input/output devices connected to the computer.

The display output unit 121 converts and outputs the image output from the program into an image signal displayable by the display device. Moreover, the display output unit 121 has the image memory 21 illustrated in FIG. 1 therein, and manages the image memory 21. That is, in the embodiment, the display output unit 121 has a function to allow the automatic determination application 101 to acquire the image which the error detection verification application 102 is to display in the display device.

The mouse event processing unit 122 receives a signal of the mouse which is a pointing device and generates a mouse event based on the signal, and delivers the generated mouse event to the program. The mouse event is movement of a mouse cursor or various clicks (single click, double click, etc.) of mouse buttons (right button, left button, etc.) or rotation of a mouse wheel when the mouse wheel exists. In the embodiment, the mouse event processing unit 122 receives an indication for replacing a signal from the mouse from the automatic determination application 101, generates the mouse event according to the indication, and delivers the corresponding event to the error detection verification application 102 via the operating system 141 as necessary.

The keyboard event processing unit 123 receives the signal of the keyboard which is a device for inputting characters, etc., and generates the event of the keyboard based on the signal and delivers the generated event to the program. The keyboard event is an event corresponding to a specific event being pressed. In the embodiment, the keyboard event processing unit 121 receives an indication for replacing a signal from the keyboard from the automatic determination application 101, generates the keyboard event based on the indication, and delivers the event to the error detection verification application 102 via the operating system 141 as necessary.

As described above, each of the mouse event processing unit 122 or the keyboard event processing unit 123 is capable of exerting an action such as manipulating the mouse or the keyboard to the error detection verification application 102. In the embodiment, each of the mouse event processing unit 122 or the keyboard event processing unit 123 generates an appropriate event according to the determination result output from the automatic determination application 101. Moreover, herein, it is described that the mouse or the keyboard is used as an example of the input device, but when another input device (e.g., the touch panel, the touch pen, the voice, the optical pattern (barcode or 2D code) reader, however, are not limited thereto) is used, the program for handling each device is put in the event handling layer.

When the defect candidate image is the false information (i.e., error detection), in other words, when a product state corresponding to the detect candidate image is 'good', the mouse event processing unit 122 or the keyboard event processing unit 123 generates the event (mouse manipulation or keyboard manipulation) corresponding to the determination result. As a result, a fact that the defect candidate image is the false information is delivered to the error detection verification device 2. Meanwhile, when the defect candidate image is the true information (i.e., indicating that the product is truly defect), in other words, when the product state corresponding to the defect candidate image is 'defect', the mouse event processing unit 122 or the keyboard event processing unit 123 generates the event (mouse manipulation or keyboard manipulation) corresponding to the determination result. As a result, a fact that the defect candidate image is the true information is delivered to the error detection verification device 2.

Figure 3:
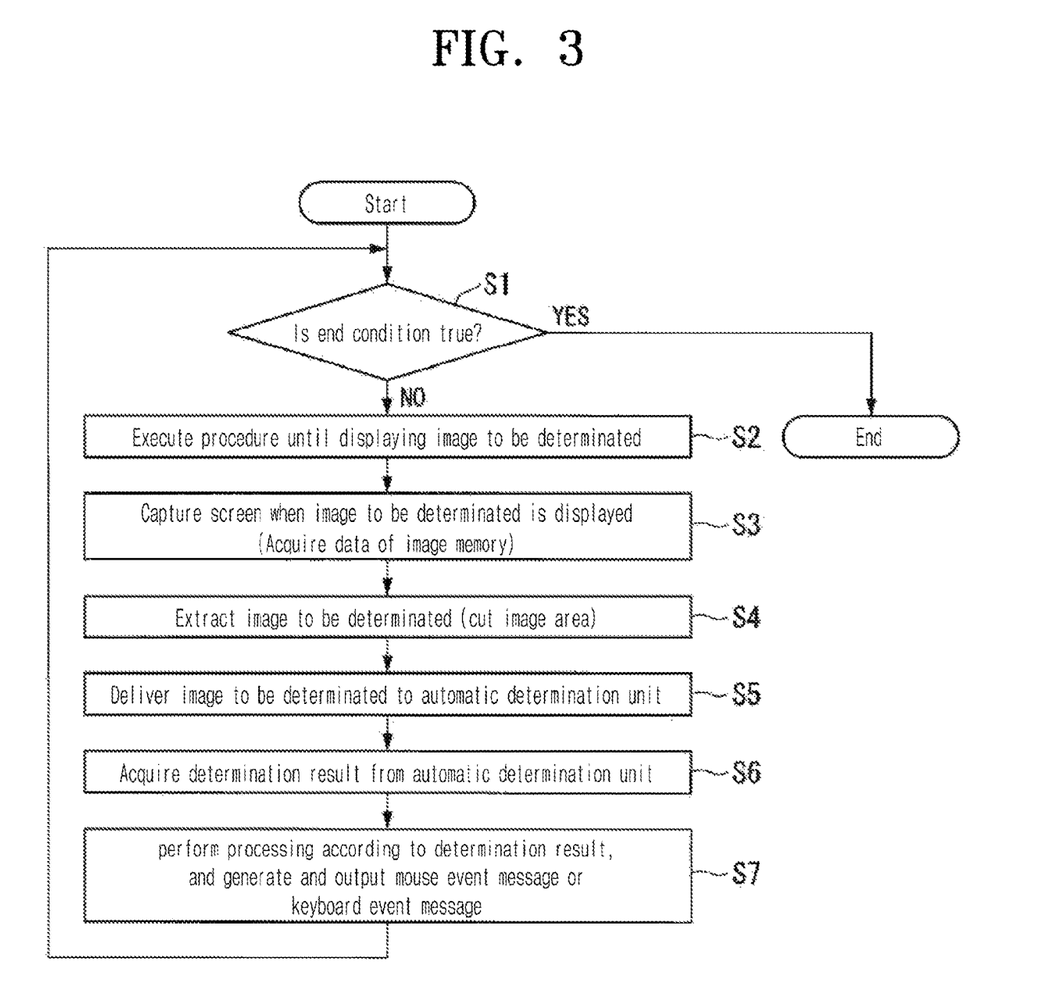
FIG. 3 is a flowchart illustrating a processing procedure when an automatic determination process device according to the first embodiment operates based on a predetermined scenario.

FIG. 3 is a flowchart illustrating a processing order when the automatic determination process device 1 operates based on a predetermined scenario example. Hereinafter, an operation order will be described according to the flowchart.

First, in step S1, the automatic determination process device 1 judges whether an end condition is true or not. When the end condition is true (step S1: YES), total processing of the flowchart ends. When the end condition is not true (step S1: NO), the process proceeds to next step S2. The end condition is, for example, that there is no image to be judged next (end of images). Whether there is the image to be judged next is appropriately notified to the scenario execution unit 14. Alternatively, another end condition (e.g., there will be a processing end indication fro the operator) may be added.

Next, in step S2, the scenario execution unit 14 executes a procedure until displaying the image to be determined. Such a procedure may include, for example, processing of indicating processing of a manipulation for the mouse or the keyboard for the indication device 22. By executing this step, the error detection verification device 2 executes processing for displaying the image to be determined in the display device.

Next, in step S3, when it is detected that the image to be determined is displayed in the display device, the scenario execution unit 14 captures the screen of the display device. Specifically, the scenario execution unit 14 acquires data of an image of an entire screen from the image memory 21. Moreover, in order to detect that the image to be determinated is displayed in the display device, for example, the scenario execution unit 14 judges whether a specific image is displayed in a predetermined area in the screen.

Next, in step S4, the scenario execution unit 14 extracts an area of the image to be determined from image captured in step S3. For example, when an area location (e.g., coordinate X and coordinate Y of each of a top left point and a bottom right point of a rectangular area) of the image to be determinated on the captured screen is already known, the scenario execution unit 14 outs the image to be determined by using the corresponding coordinate value.

Next, in step S5, the scenario execution unit 14 passes the image to be determined, which is extracted in step S4 to the automatic determination unit 15. The automatic determination unit 15 determinates whether the passed image (defect candidate image) is the true information (defect) or the false information (good).

Next, in step S6, the scenario execution unit 14 acquires the determination result from the automatic determination unit 15. The determination result is one of the true information (defect) or the false information (good).

Next, in step S7, the scenario execution unit 14 performs predetermined processing according to the determination result received in step S6. Specifically, the scenario execution unit 14 sends an indication to the indication device 22 so as to generate and output a mouse vent message or a keyboard event message according to the determination result. As a result, the indication device 22 executes equivalent processing to executing an action corresponding to the determination result for the error detection verification device 2.

A processing example of the indication device 22 is described as follows. When the determination result is the true information (defect), as an example, the indication device 22 moves the mouse cursor to an area where a button of "true information (defect)" on the screen of the error detection verification device 2 is displayed, and then sends a message for clicking a left button of the mouse to the error detection verification device 2. When the determination result is the false information (good), as an example, the indication device 22 moves the mouse cursor to an area where a button of "false information (good)" on the screen of the error detection verification device 2 is displayed, and then sends a message for clicking a right button of the mouse to the error detection verification device 2. As such, the button in the embodiment includes a button of a form displayed on a display screen.

Figure 4:
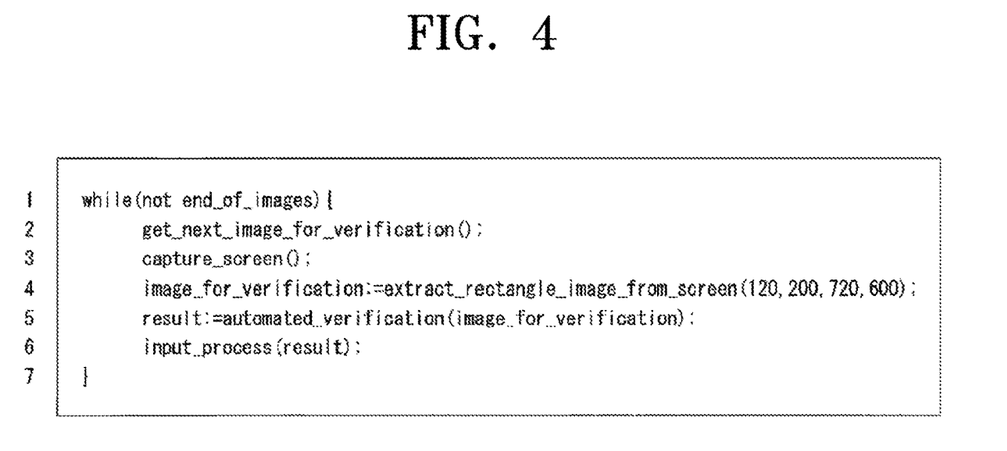
FIG. 4 is a schematic diagram illustrating one example of text data illustrating a scenario corresponding to a processing order of FIG. 3 of the automatic determination process device according to the first embodiment

FIG. 4 is a schematic diagram illustrating one example of the scenario executed by the scenario execution unit 14. The scenario illustrated in the figure is described as a predetermined language. The scenario is sequentially interpreted and executed by n interpreter function f the scenario execution unit, for example. Alternatively, the scenario may be translated and executed into a command column of another format by a compiler. The scenario corresponds to the processing order of the flowchart illustrated in FIG. 3. Further, for convenience, a row number is assigned to the scenario. Hereinafter, the scenario will be described.

A first row of the scenario is clause 'while'. The condition is "not end_of_images". "end_of_images" as a variable having a value indicating a situation represents that the image to be determined ends and the image to be determinated does not exist (end condition). Further, "not" is a logic operator of negative. That is, the clause 'while' represents that a scenario of a part surrounded by let curlybraces of the first row and right curlybraces of a seventh row should be executed if the image to be determined remains.

A second row to a sixth row of the scenario are an order of processing sequentially executed in a state 1 which the 'white' clause condition is true.

The second row indicates processing of executing function 'get_next_image_for_verification( )'. The function corresponds to the processing of step S2 in FIG. 3. As a result of executing the function, the error detection verification device 2 displays a next image (defect candidate image) to be judged. Thereby, data of the next defect candidate image is stored in a predetermined area of the image memory 21.

A third row representing processing of executing function 'capture_screen( )'. The function corresponds to the processing of step S3 in FIG. 3. By executing the function, the automatic determination process device 1 captures the screen displayed by the error detection verification device 2. In other words, the automatic determination process device 1 acquires the data of the image in the image memory 21.

The fourth row indicates processing of executing function 'extract_rectabgle_image_from_screen( )'. The function corresponds to the processing of step S4 in FIG. 3. That is, the automatic determination process device 1 extracts the image in a predetermined area in the display screen. In this example, a coordinate value indicating a rectangular to be extracted is passed as a real factor for the function. As one example, an image of a point at a top left corner of a rectangle is (x,y)=(120,200) and an image of a point at a bottom right corner of the rectangle is (x,y)=(720,600). Moreover, it is premised that the defect candidate image to be determinated is displayed in a rectangular area specified by the coordinate value. Here, the data of the extracted image is substituted into variable 'image_for_verification' which is a 2D matrix for storing the image data.

A fifth row representing processing of executing function 'automated_verification( )'. The function corresponds to the processing of step S5 to S6 in FIG. 3. Data of the image to be determinated stored in the variable 'image_for_verification' is delivered as the factor of the function. That is, the automatic determination process device 1 performs the determination processing for the image to be determined and acquires the determination result by executing the function.

Specifically, by executing the function, the scenario execution unit 14 delivers the image to be determinated to the automatic determination unit 15 and receives a determination result which is a result of the delivery as a return value of the function. The return value of the function 'automated_verification( )' is substituted into variable 'result'. A value of 'result' indicates "good" or "defect".

A sixth row representing processing of executing function 'input_process( )'. The function corresponds to the processing of step S7 in FIG. 3. The value of the variable 'result' is delivered as the factor of the function. Processing of the function 'input_process( )' incurs each appropriate mouse event or keyboard event according to the determination result (good or defect) passed as the factor. By such a virtual mouse manipulation or keyboard manipulation, the automatic determination process device 1 may properly deliver information of the determination result to the error detection verification device 2. Further, in addition to the mouse manipulation or keyboard manipulation, an input method by the touch panel, a pen tab, or a voice may be used. In the case of the input by the voice, the device performs voice recognition processing. Even in the case of the input by the touch panel, the pen tab, or the voice, the processing of the function 'input_process( )' incurs an event such as the mouse event.

Moreover, as long as the condition of the clause 'while' of the first row is true, the processing from the second row to the sixth row is repeated. This corresponds to returning to the processing of step S1 after the processing of step S7 in FIG. 4.

Figure 5:
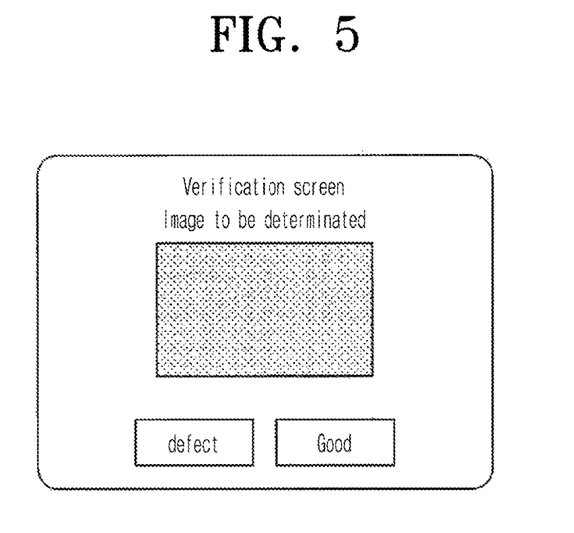
FIG. 5 is a schematic diagram illustrating an example of a screen (user interface) displayed by the error detection verification device according to the first embodiment.

FIG. 5 is a schematic diagram illustrating an example of the screen displayed by the error detection verification device 2. As illustrated, the screen has a rectangular area for displaying the image to be determinated. Further, the screen includes a button for selectively inputting one of 'defect' or 'good'. The automatic determination process device 1 may acquire data of an image included in the screen from the image memory 21.

Further, the automatic determination process device 1 may deliver an equivalent signal to pressing a defect button or a good button to the indication device 22. For example, the automatic determination process device 1 incurs the mouse event to move the mouse cursor to any place in an area in the defect button, and then click the left button of the mouse at the location. In this case, information such as pressing the "detect" button is received by the error detection verification device 2. Further, the automatic determination process device 1 incurs the mouse event to move the mouse cursor to any place in an area in the good button, and then click the left button of the mouse at the location. In this case, information such as pressing the "good" button is received by the error detection verification device 2.

Further, the automatic determination process device 1 incurs the keyboard event instead of the mouse event to perform a determination manipulation (e.g., key 'enter' is used) by moving a focus to the 'defect' button (e.g., key 'tab' is used). In this case, information such as pressing the "defect" button is received by the error detection verification device 2. Further, the automatic determination process device 1 incurs the event of the keyboard to perform the determination manipulation (as in the above case, e.g., the key 'enter' is used) by moving the focus to the 'good' button (as in the above case, e.g., the key 'tab' is used). In this case, information such as pressing the "good" button is received by the error detection verification device 2.

Moreover, the automatic determination process device 1 may appropriately define and set a relationship between the determination result output from the automatic determination unit 15 and the event (the event for the mouse or the keyboard) output from the scenario execution unit. Accordingly, even though only setting the relationship between the determination result and the event is changed, the signal (the signal of the event) output by the automatic determination process device 1 may be changed.

Figure 6:
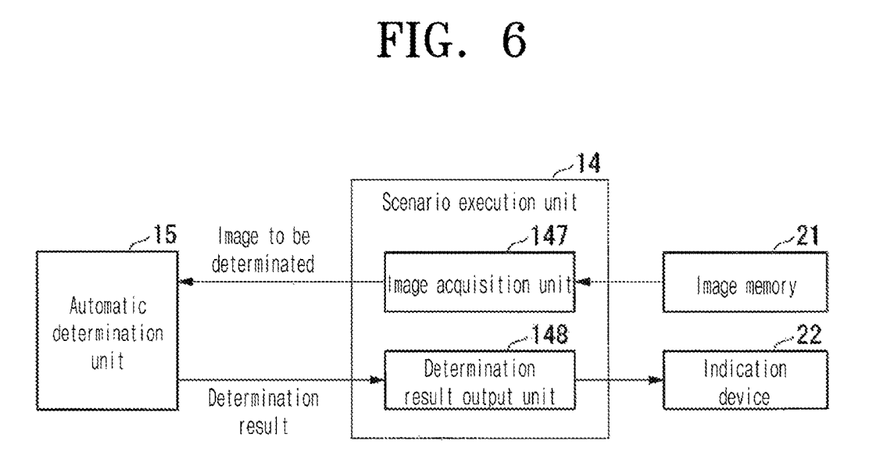
FIG. 6 is a schematic block diagram of a functional configuration of a scenario execution unit when a specific scenario is executed by a scenario execution unit according to the first embodiment.

FIG. 6 is a schematic block diagram of a functional configuration of the scenario execution unit 14 when the scenario execution unit 14 executes a specific scenario. As illustrated, by executing the scenario, the scenario execution unit 14 serves as an image acquisition unit 147 and a determination result output unit 148. The image acquisition unit 147 reads the image which the error detection verification device 2 displays in the display device from the image memory 21 which is a medium for displaying the image in the display device. That is, the image acquisition unit 147 executes an image acquisition step. The determination result output unit 148 receives the determination result from the automatic determination unit 15 and generates a signal according to the determination result. The signal is an equivalent signal (event) to a case of inputting information by intervening the input device (the mouse, the keyboard, the touch panel, etc.) connected to the error detection verification device 2. That is, the determination result output unit 148 executes a determination result output step. As described above, the scenario stored in the scenario storage unit 13 allows the scenario execution unit to serve as the image acquisition unit and the determination result output unit 148.

Features of the embodiment are organized as follows.

The image acquisition unit 147 (scenario execution unit 14) reads the image which an external device (the error detection verification device 2) displays in the display device from a medium (the image memory 21) for displaying the image in the display device.

The automatic determination unit 15 executes determination processing based on contents of the image (image to be determinated) read by the image acquisition unit 147 to output the determination result (whether a product corresponding to the image to be determinated is "good" or "defect").

Since the automatic determination unit 15 holds a model of which machine learning ends for the relationship between the image and the determination result, the automatic determination unit 15 may perform the determination processing by applying the model to the image. An example of the model of which machine learning ends is a neural network.

The determination result output unit 148 (scenario execution unit 14) generates an equivalent signal (event) to a case of inputting information for the input device (the mouse, the keyboard, the touch panel, etc.) connected to the external device as the signal according to the determination result.

The input device may be at least nay one of the mouse or the keyboard.

The external device (error detection verification device 2) may also display and output the defect candidate image detected by optically reading the electronic circuit (printed substrate, etc.) as the image.

In this case, the automatic determination unit 15 outputs the determination result by performing processing of determining whether the electronic circuit is good or defect based on the defect candidate image.

The automatic determination process device 1 may have the scenario execution unit 14. The scenario execution unit 14 executes a scenario in which the processing order is described. The scenario allows the scenario execution unit 14 to serve as the image acquisition unit 147 and the determination result output unit 148. Further, the scenario execution unit may perform a processing procedure required for the external device (error detection verification device 2) to display the image in the display device by executing, the scenario. Specifically, the processing of step S2 illustrated in FIG. 3 corresponds to the processing order. That is, the scenario execution unit 14 incurs the mouse event and the keyboard event in the indication device through the processing. The error detection verification device 2 performs a predetermined motion based on the event. As a result, the error detection verification device 2 executes processing for verifying the defect candidate image. In addition, the error detection verification device 2 displays the defect candidate image in the display device. That is, the defect candidate image is written in the image memory 21.

Second Embodiment

Next, a second embodiment will be described. Further, matters already described in the first embodiment may not be described below. Here, special matters of the embodiment will be primarily described.

Figure 7:
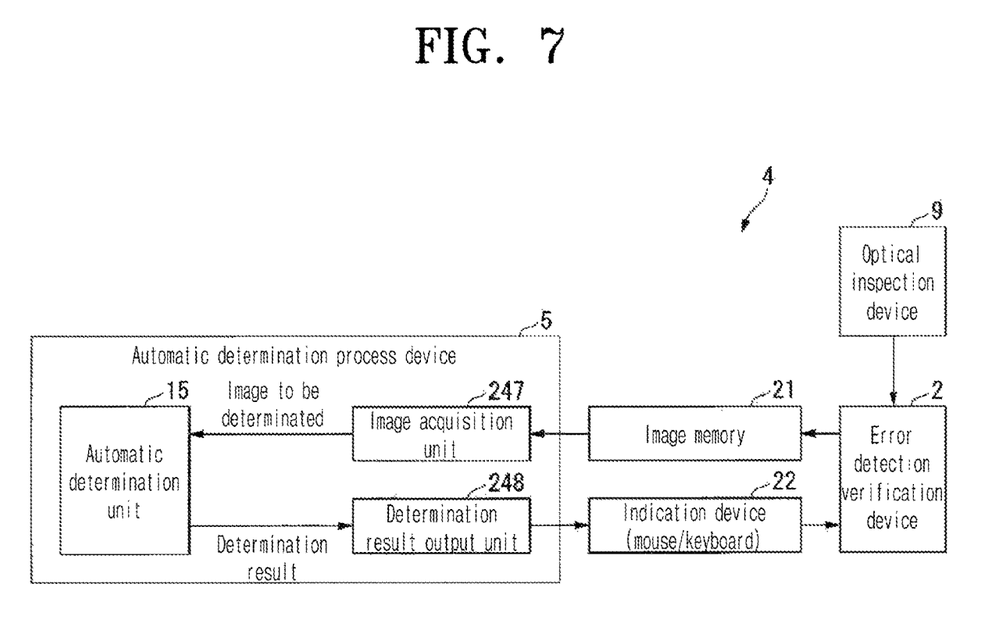
FIG. 7 is a block diagram illustrating a functional configuration of an inspection system according to a second embodiment.

FIG. 7 is a block diagram illustrating a functional configuration of an inspection system according to the embodiment. As illustrated, an inspection system 4 includes an automatic determination process device 5, an error detection verification device 2, and an optical inspection device 9. The automatic determination process device 5 includes an automatic determination unit 15, an image acquisition unit 247, and a determination result output unit 248. Further, the automatic determination process device 5 according to the embodiment does not have a function for editing a scenario, a function for storing the scenario, or a function for executing the scenario. In the embodiment the image acquisition unit 247 or the determination result output unit 248 is implemented by the scenario, but implemented as each dedicated function. The image acquisition unit 247 or the determination result output unit 248 may be implemented by using a dedicated electronic circuit and implemented by using the computer and the program. The image acquisition unit 247 reads the image which the error detection verification device 2 displays in the display device from the image memory 21 which is a medium for displaying the image in the display device. The determination result output unit 248 receives the determination result from the automatic determination unit 15 and generates a signal according to the determination result. The signal is an equivalent signal (event) to a case of inputting information by intervening the input device (the mouse, the keyboard, the touch panel, etc.) connected to the error detection verification device 2. Further, the inspection system 4 as a part of a function for an input/output includes an image memory 21 and the indication device 22 as in the case of the first embodiment.

In the second embodiment, the automatic determination process device 5 is not implemented by using the scenario. However, the second embodiment is the same as the first embodiment in that the automatic determination process device 5 acquires the image output by the error detection verification device 2, the automatic determination process device 5 determinates a situation of the image based on the image, or the automatic determination process device 5 executes an indication for manipulating the error detection verification device 2 based on the determination result.

Hereinabove, a plurality of embodiments is described, but the present invention is executable even by the following modified example. For example, in each embodiment, the automatic determination process device acquires the image to be determinated from the image memory 21, i.e., a storage medium. However, the image to be determinated may be acquired from not the storage medium but a transmission medium (an electrical cable or an optical cable) for transmitting the image.

Figure 8:
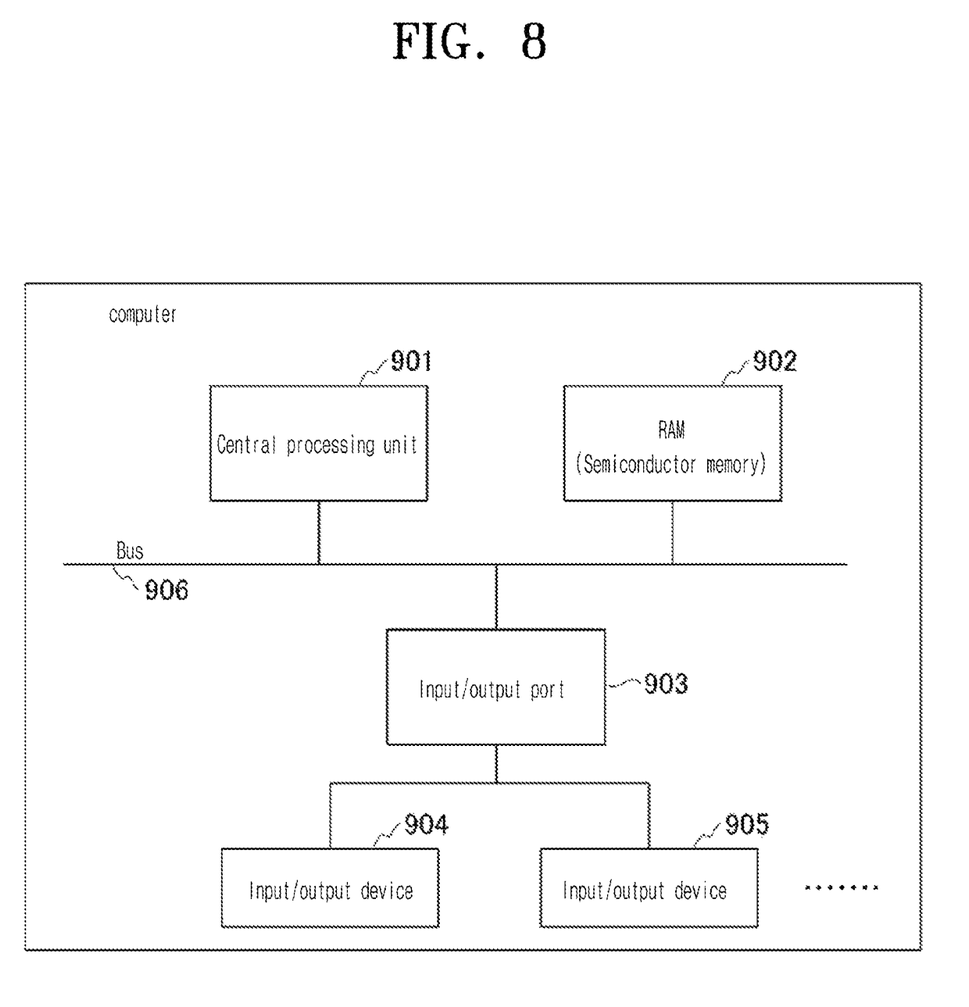
FIG. 8 is a block diagram illustrating an example of internal configurations of an automatic determination process device, an error detection verification device, an optical inspection device, and an indication device in the first and second embodiments.

FIG. 8 is a block diagram illustrating an example of internal configurations of an automatic determination process device, an error detection verification device, an optical inspection device, and an indication device in the first or second embodiment. Each device listed herein may be implemented by using the computer. As illustrated, the computer is configured to include a central processing unit 901, a RAM 902, an input/output unit 903, an input/output device 904, 905, etc., and a bus 906. The computer itself is implementable by using the existing technology. The central processing unit 901 executes a command included in a program read in the RAM 902, etc. The central processing unit 901 starts writing data to the RAM 902 or reading the data from the RAM 902, or performs an arithmetic operation or a logical operation according to each command. The RAM 902 stores the data or the program. Each element included in the RAM 902 may be accessed with an address and using the address. Moreover, the RAM is an abbreviation of 'random access memory'. The input/output port 903 is a port for the central processing unit 901 to send and receive data to and from an external input/output device. The input/output device 904, 905, etc., is an input/output device. The input/output device 904, 905, etc., exchanges the data with the central processing unit 901 through the input/output port 903. The bus 906 is a common communication line used in the computer. For example, the central processing unit 901 reads and write the data of the RAM 902 through the bus 906. Further, for example, the central processing unit 901 accesses the input/output port via 906.

At least some functions of the automatic determination process device, the error detection verification device, the optical inspection device, and the indication device in each embodiment may be implemented by the computer program. In this case, a program for implementing the function is recorded in a computer readable recording medium and the program recorded in the recoding medium is read and executed by a computer system, and as a result, the function may be implemented. The 'computer system' described herein refers to a system including hardware such as an OS or peripheral devices. Further, the 'computer readable recording medium' refers to a storage device such as a portable medium such as a flexible disk, a magneto-optic disk, a ROM, a CD-ROM, a DVD-ROM, a USB memory, etc., a hard disk embedded in the computer system, etc. Moreover, the 'computer readable recording medium' may also include a medium temporarily dynamically keeping and holding the program like a communication line in a case of transmitting the program via a network such as the Internet, etc., or a communication line such as a telephone line, etc., and a medium holding the program for a predetermined time, such as a volatile memory of a computer system which becomes a server or a client in that case. Further, the program may implement some of the functions and further, the above-described function may be implemented in cooperation with a program already recorded in the computing system.

Hereinabove, according to one (including the modified example) of the described embodiments, the determination operation which the person performs in the related art may be replaced with automatic processing by the computer, etc. As a result, operation cost of the inspection may be reduced. Further, a judgment criterion may be constantly provided and it is effective in terms of quality management as compared with the case where the person performs the determination operation.

Further, the automatic determination process device acquires the image which the error detection verification device 2 displays in the display device and pseudoly passes the determination result to the error detection verification device 2 via the input device connected to the error detection verification device 2. By adopting such a scheme, a structure (mechanism) of automatic determination may be added without changing the existing error detection verification device 2.

Hereinabove, the embodiments of the present invention are described above with reference to the drawings, but a specific configuration is not limited to the embodiments, but also includes a design within the scope without departing from the spirit of the present invention.

INDUSTRIAL APPLICABILITY

The present invention may be used in an inspection system using an optical photographing means, for example. However, an application range of the present invention is not limited to those exemplified herein.

EXPLANATION OF REFERENCE NUMERALS AND SYMBOLS

1, 5: Automatic determination process device
2: Error detection verification device
3, 4: Inspection system
9: Optical inspection device
12: Scenario edition unit
13: Scenario storage unit
14: Scenario execution unit
15: Automatic determination unit
21: Image memory
22: Indication device
101: Automatic determination application
102: Error detection verification application
121: Display output unit
122: Mouse event processing unit
123: Keyboard event processing unit
141: Operating system
147, 247: Image acquisition unit
148, 248: Determination result output unit
901: Central processing unit
902: RAM
903: Input/output port
904, 905: Input/output device
906: Bus

The invention claimed is:

1. An automatic determination process device comprising:
a processor coupled to a memory storing instructions to permit the processor to function as:
an error detection verification device;
an image acquisition unit reading a defect candidate image displayed by the error detection verification device displaying the defect candidate image in a display device and acquiring information of a determination result for the defect candidate image through an input as a secondary inspection from a medium for displaying the defect candidate image in the display device;
an automatic determination unit outputting a determination result by executing automatic determination processing based on contents of the defect candidate image read by the image acquisition unit; and
a determination result output unit generating a signal which is a signal according to the determination result and is equivalent to pressing one of a 'defect' button or a 'good' button included in a screen which the error detection verification device displays through the input connected to the error detection verification device.

2. The automatic determination process device of claim 1, wherein the automatic determination unit possesses a model of which machine learning is completed for a relationship between the defect candidate image and the determination result, and applies the model to the image to perform the determination processing.

3. The automatic determination process device of claim 1, wherein the error detection verification device displays and outputs the defect candidate image detected by optically reading an electronic circuit, and
the automatic determination unit outputs the determination result by determining whether the electronic circuit is good or defect based on the defect candidate image.

4. The automatic determination process device of claim 1, wherein the input is at least one of a mouse or a keyboard,
when the input is the mouse, the determination result output unit incurs a mouse event to move any one area of the "defect" button or the "good" button, and then generate a signal for clicking the mouse, and
when the input is the keyboard, the determination result output unit incurs a keyboard event to move a focus to any one area of a "defect" button or a "good" button, and then generate clicking the mouse, and generate a signal of a determination manipulation.

5. The automatic determination process device of claim 1, wherein the processor further functions as:
a scenario execution unit executing a scenario in which a processing order is described,
wherein the scenario allows the scenario execution unit to serve as the image acquisition unit and the determination result output unit.

6. The automatic determination process device of claim 5, wherein the scenario execution unit also performs a processing procedure required for the error detection verification device to display the image in the display device by executing the scenario.

7. A non-transitory computer readable medium having a program stored thereon to allow a computer to serve as the automatic determination process device of claim 1.

8. A non-transitory computer readable recording medium having a program allowing a computer to serve as the automatic determination process device of claim 1.

9. An inspection system comprising:
the automatic determination process device of claim 1;
wherein the processor further functions as:
an optical inspection device detecting the defect candidate image as a primary inspection as an optically photographed image,
the error detection verification device displaying the defect candidate image detected by the optical inspection in the display device and acquiring information of the determination result for the defect candidate image through the input as the secondary inspection.

10. An automatic determination processing method comprising:
reading a defect candidate image displayed by an error detection verification device displaying the defect candidate image in a display device and acquiring information of a determination result for the defect candidate image through an input device as a secondary inspection from a medium for displaying the defect candidate image in the display device;
outputting a determination result by executing automatic determination processing based on contents of the defect candidate image read in the reading the defect candidate image; and
generating a signal which is a signal according to the determination result and is equivalent to pressing one of a 'defect' button or a 'good' button included in a screen which the error detection verification device displays through the input device connected to the error detection verification device.

* * * * *